United States Patent [19]

Chuta et al.

[11] Patent Number: 5,347,189
[45] Date of Patent: Sep. 13, 1994

[54] SPINDLE MOTOR WITH LABYRINTH SEALED BEARING

[75] Inventors: Masanobu Chuta, Naka; Tokumon Ogawa, Komagane, both of Japan

[73] Assignee: Nippon Densan Corporation, Kyoto, Japan

[21] Appl. No.: 951,661

[22] Filed: Sep. 25, 1992

[30] Foreign Application Priority Data

Sep. 25, 1991 [JP] Japan .................. 3-274833
Sep. 30, 1991 [JP] Japan .................. 3-280455

[51] Int. Cl.⁵ .................. H02K 5/124; H02K 7/08
[52] U.S. Cl. ....................... 310/90; 310/85; 277/56
[58] Field of Search ........... 310/67 R, 85, 88, 90, 310/156; 277/56

[56] References Cited

U.S. PATENT DOCUMENTS

| | | | |
|---|---|---|---|
| 2,011,192 | 10/1935 | Comstock | 310/90 |
| 4,380,341 | 4/1983 | Waldshütz et al. | 277/56 |
| 4,697,978 | 10/1987 | Tada | 414/729 |
| 4,827,168 | 5/1989 | Nakajima | 310/90 |
| 4,894,738 | 1/1990 | Elsasser et al. | 360/97.1 |
| 4,922,406 | 5/1990 | Schuh | 360/97.03 |
| 5,029,876 | 7/1991 | Orlando et al. | 277/56 |
| 5,061,868 | 10/1991 | Iwazaki et al. | 310/67 R |
| 5,128,571 | 7/1992 | Itsu | 310/67 R |

*Primary Examiner*—R. Skudy
*Assistant Examiner*—D. R. Haszko
*Attorney, Agent, or Firm*—McCormick, Paulding & Huber

[57] ABSTRACT

A spindle motor comprises a stationary member, a hub for rotation relative to the stationary member, bearings provided between the stationary member and the hub, and a labyrinth seal provided outside one of the bearings. In particular, the labyrinth seal includes a plurality of labyrinth units. Each labyrinth unit is consisted mainly of a first member mounted to the stationary member and a second member mounted to the hub.

2 Claims, 5 Drawing Sheets

SPINDLE MOTOR WITH LABYRINTH SEALED BEARING

FIELD OF THE INVENTION

The present invention relates to a spindle motor for rotation of a recording disk such as a magnetic disk.

DESCRIPTION OF THE INVENTION

One such prior art spindle motor is disclosed in U.S. Pat. No. 4,922,406, which comprises a bracket, a hub rotatably mounted by bearings to the bracket, a rotor magnet mounted to the hub, and a stator arranged opposite to the rotor magnet. There is also a labyrinth sealing means provided between the bracket and the hub for preventing entrance of dirt and impurities, e.g. drops of grease, into a disk chamber.

However, conventional labyrinth sealing means are intricate in the construction and their adequate application is not compliant. In practice, they hardly undertake the fulfillment of labyrinth effect.

Also, disclosed in U.S. Pat. No. 4,894,728 is another spindle motor of similar type which has urging means or namely, dish springs for applying a preliminary pressure onto the bearings mounted between a bearing member and a hub.

The installation of such urging means causes the spindle motor to have a considerable size, thus contributing to no down-sizing.

There is a known spindle motor in which a hub is rotatably supported at both ends by a pair of bearings. The bearings are seated on bearing members which have through apertures for lead wires extending from the stator to the outside.

The lead wires may however touch the inner wall of the hub. For prevention of the direct contact of the lead wires to the hub wall, a fair spacing is needed between the lead wires and the hub wall. This causes the spindle motor to remain substantial in the size.

SUMMARY OF THE INVENTION

It is a first object of the present invention to provide a spindle motor in which the labyrinth effect can satisfactorily be ensured with a relatively simple arrangement.

It is a second object of the present invention to provide a spindle motor arranged minimized in size by means of improved installation of an urging means.

It is a third object of the present invention to provide a spindle motor arranged minimized in size by means of improved fastening of a lead cable from the stator.

Other objects and features of the present invention will be apparent from the following description.

DETAILED DESCRIPTION OF THE PREFERRED EMBODIMENTS

Figure 1:
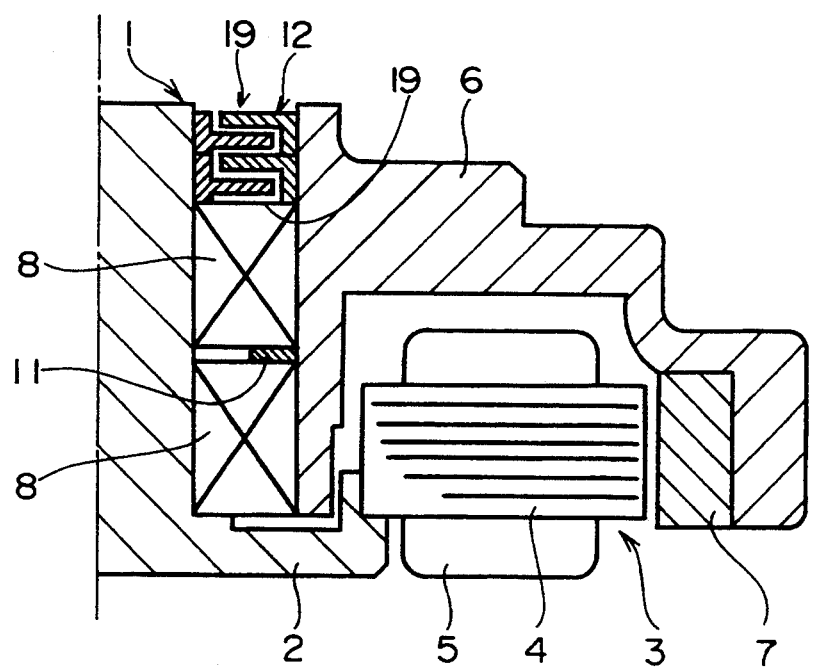
FIG. 1 is a cross sectional view of a primary part of a spindle motor showing a first embodiment of the present invention.

FIG. 1 is a cross sectional view of a spindle motor showing one embodiment of the present invention. The spindle motor has a shaft 1 which acts as a stationary member. The shaft 1 has at lowermost an annular support 2 formed integral therewith.

A stator 3 is fixedly mounted to the circumference side of the annular support 2. The stator 3 comprises a stator core 4 and a stator coil 5 wound on the stator core 4.

The shaft 1 has a hub 6 rotatably mounted thereto. The hub 6 is designed for carrying thereon a recording disk, e.g. a magnetic disk, and has an annular rotor magnet 7 mounted to the inner surface thereof. The stator 3 is arranged to face the inner side of the rotor magnet 7 with a minimal distance. More specifically, the hub 6 is mounted by a pair of bearings 8,8 to the shaft for smooth rotation. The two bearings 8,8 are fitted onto the shaft 1 and the hub 6 is secured to the outer sides of the bearings 8,8. Also, a spacer 11 is provided between the two bearings 8,8.

Figure 2:
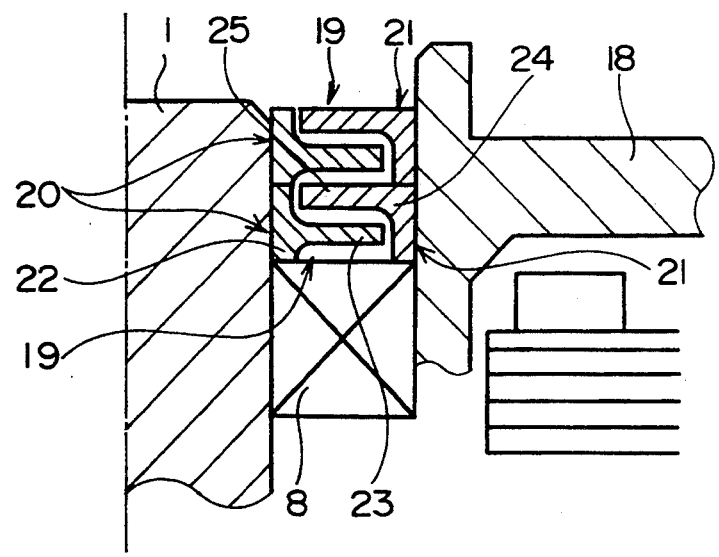
FIG. 2 is a partially enlarged cross sectional view showing a labyrinth unit and its proximity region in the spindle motor illustrated in FIG. 1.

A labyrinth sealing means 12 is arranged above or outside the upper one of the two bearings 8,8. As best shown in FIG. 2, the labyrinth sealing means 12 includes a labyrinth unit 19 consisted mainly of a first 20 and a second member 21 which serve in combination as a labyrinth sealer. Each first member 20 comprises an annular body 22 fixedly mounted to the shaft 1 and an outward projection 23 extending radially outwardly from a lower end of the annular body 22. Each second member 21 comprises an annular body 24 and an inward projection 25 extending radially inwardly from the uppermost end of the annular body 24. The annular body 24 of the second member 21 is fixedly mounted to the inner surface of an end wall 18 of the hub 6. The annular body 22 of the first member 20 is arranged equal in height to the annular body 24 of the second member 21. Accordingly, a series of the first and second members 20,21 can be coupled to one another to align in the axial direction of the motor (vertically), forming a row of the labyrinth units 19. The first embodiment employs two of the labyrinth units 19 coupled to each other vertically, as shown in FIGS. 1 and 2. For increasing the labyrinth effect, three or more units may be arranged in a row.

The first 20 and second member 21 are formed of a plastic or metallic material. As illustrated in FIGS. 1 and 2, the first member 20 is arranged of T shape in cross section while the second member 21 is arranged of L shape in cross section.

For assembling the labyrinth unit 19 above the upper bearing 8 between the shaft 1 and the hub 6, the first member 20 is first fitted onto the shaft 1 by pressing or bonding and then, the second member 21 is fitted into the end wall 18 of into the hub 6. The space between the first 20 and second member 21 (i.e. a labyrinth sealing distance) is determined to a given width and arranged to wind, in cross section, from top through bottom. The labyrinth units 19 are provided for preventing escape of the grease filled in the motor by means of the labyrinth effect, because the grease tends to leak through the bearings 8 during the rotation of the hub 6. In particular, the labyrinth passage has a zigzag form in cross section so that its distance from the upper bearing 8 to the outside of the motor can effectively be increased. This upgrades the sealing effect and leakage and escape of the grease will substantially be prevented.

Figure 3:
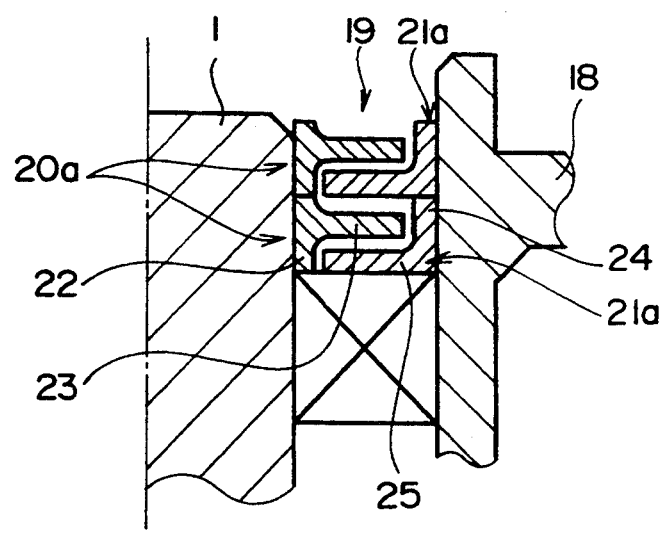
FIG. 3 is a partially enlarged cross sectional view showing a first modification of the labyrinth unit of the first embodiment.
Figure 4:
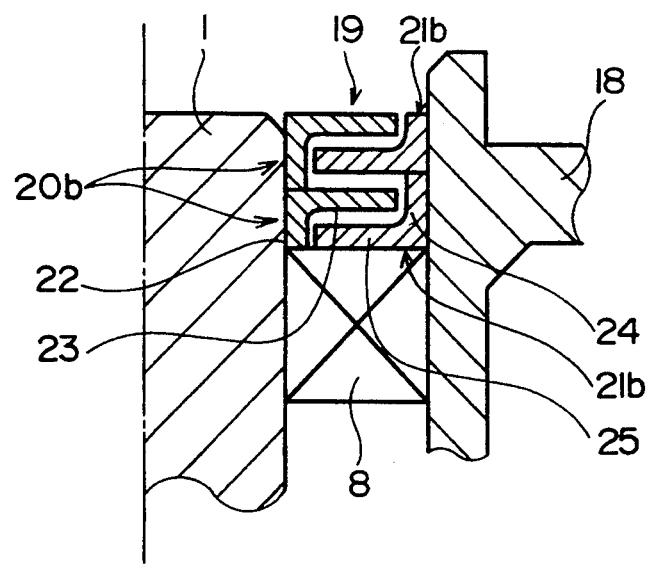
FIG. 4 is a partially enlarged cross sectional view showing a second modification of the labyrinth unit of the same.
Figure 5:
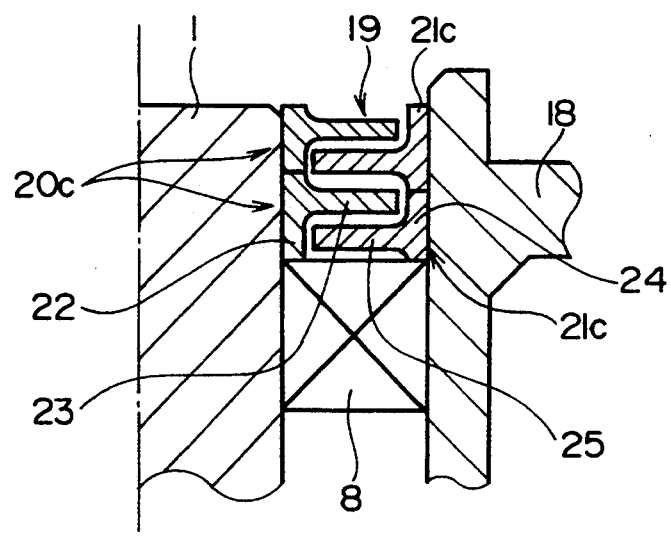
FIG. 5 is a partially enlarged cross sectional view showing a third modification of the labyrinth unit of the same.

The labyrinth unit 19 may have another construction such as shown in FIGS. 3, 4, and 5. FIG. 3 illustrates a first 20a and a second member 21a arranged in a reverse of the construction shown in FIGS. 1 and 2. FIG. 4 shows that both a first 20b and a second member 21b are formed of an L shape in cross section. FIG. 5 shows a first 20c and a second member 21c both formed of a T shape in cross section. The first member 20, 20a, 20b, or 20c located at the uppermost may be urged down towards the inner race of the upper bearing 8. Otherwise, the second member 21, 21a, 21b, or 21c at the uppermost may be urged towards the outer race of the upper bearing 8.

Figure 6:
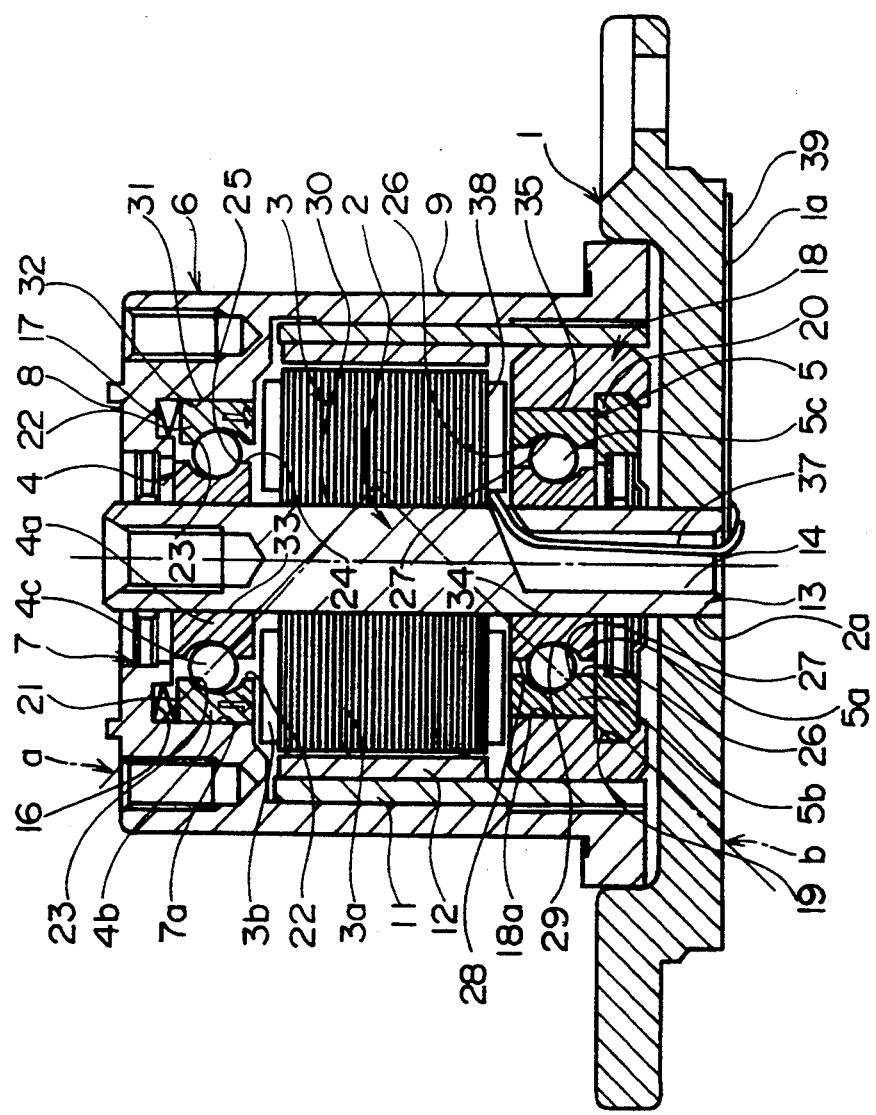
FIG. 6 is a cross sectional view of another spindle motor showing a second embodiment of the present invention.

FIG. 6 illustrates another spindle motor showing a second embodiment of the present invention. The spindle motor of the second embodiment comprises a bracket 101, a shaft member 102 mounted upright on the bracket 101, a stator 103 fitted onto the shaft member 102, and a hub 106 mounted by two bearings 104 and 105 to the shaft means 103.

The hub 106 is consisted mainly of an end wall 108 having a center opening 107 and a hub main body 109 extending downwardly from the end wall 108. A rotor magnet 112 is mounted by a yoke 111 to the inner surface of the hub main body 109.

The stator 103 is consisted mainly of a stator core 103a and a stator coil 103b wound on the teeth of the stator core 103a. The stator core 103a is formed of a multiplicity of core laminations assembled in layers.

The shaft member 102 is fixedly secured at one end 102a to the bracket 101 and also, has a bore 114 therein extending from a central region to the lowermost end 113 thereof.

The upper bearing 104 is fitted with its outer race 104b into a large diameter portion 107a of the center opening 107 of the hub 106.

The end wall 108 of the hub 106 has an annular recess 116 provided in the inner surface thereof about the center opening 107 for opening to the inside. An urging means 117, e.g. a pair of disk springs, is installed in the annular recess 116. The urging means 117 is arranged for yieldingly pressing against the outer race 104b of the upper bearing 104. In particular, the outer race 104b of the bearing 104 is loosely fitted into the large diameter portion 107b of the center opening 107 while the inner race 104a of the same is fixedly fitted onto the shaft member 102.

The other or lower bearing 105 is fixedly fitted with its inner race 105a onto a lower end 102a of the shaft member 102 and with its outer race 105b into an annular holder 118 secured to the yoke 111. The annular holder 118 has a recess 119 in the inner surface 118a thereof for accepting a support 120 fitted into. The support 120 is provided to support the outer race 105b of the lower bearing 105.

The urging means 117 remains urging the outer surface 121 of the outer race 104b of the upper bearing 104 axially in the inward direction. Accordingly, as the outer race 104b of the bearing 104 is pressed down in the direction denoted by the arrow in FIG. 6, its inner surface 122 comes at the upper region 123 into direct contact with balls 104c while the inner race 104a directly sustains the balls 104c with a lower region 125 of the outer surface 124. As the result, the inner surface 133 of the inner race 104a is urged directly against the outer surface 130 of the shaft member 102 and the outer surface 131 of the outer race 104b is urged directly against the inner surface 132 of the large diameter portion 107a.

On the other hand, the outer race 105b of the lower bearing 105 remains sustained by the support 120 so that a lower region 127 of the inner surface 126 of the same comes into contact with balls 105c. Hence, the inner race 105a stays at the upper region 129 of the outer surface 128 in direct contact with the balls 105c. As the result, the inner surface 134 of the inner race 105a is tightly secured to the outer surface 130 of the shaft member 102 and the outer surface 135 of the outer race 105b is closely secured to the inner surface 118a of the holder 118.

The spindle motor of the second embodiment permits the two bearings 104 and 105 to remain urged by yielding pressures in their respective directions a and b shown in FIG. 6. Also, the urging means 117 is installed in the annular recess 116 of the hub 106, whereby non of an axially extending extra space for the installation will be needed between the bearing sustaining surface of the hub 106 and the upper bearing 104. Accordingly, the axial length of the motor becomes minimized.

According to the second embodiment, a lead cable 137 is coupled at one end to an opposite side of the stator coil 103b to the hub 106. The lead cable 137 extends through the bore 114 in the shaft member 102 to the outside of the motor. The other end of the lead cable 137 is connected to a pc board 139 mounted to the bottom 101a of the bracket 101.

Figure 7:
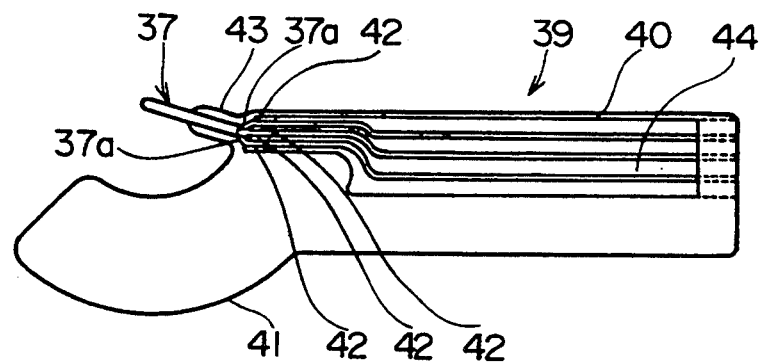
FIG. 7 is a plan view of a flexible pc board of the spindle motor illustrated in FIG. 6.

As shown in FIG. 7, the pc board 139 comprises a belt portion 140 extending to the power supply, not shown, and a curved portion 141 projecting from the proximal end of the belt portion 140 and having a corresponding shape to the bottom surface configuration of the spindle motor. Also, a plurality of land portions 142 are provided at the proximal end of the belt portion 140 for connection with the lead cable 137. A rectangular tab 143 formed of an insulating material is provided extending from the proximal end of the belt portion 140. In addition, there are a given number of magnetic sensors, not shown, aligned in a circumferential direction and wired in a pattern to the belt portion 140.

More particularly, the lead cable 137 passing the bore 114 extends through the tab 143 to a wiring region 144 of the pc board 139 where wires 137a of the lead cable 137 are connected to the land portions 142 respectively, as shown in FIG. 7. This arrangement is provided for ensuring the insulation at a bent (terminal end) of the lead cable 137.

FIG. 3 illustrates a further spindle cable according to a third embodiment of the present invention. The spindle motor of the third embodiment like the second embodiment comprises a shaft member 150, a stator 151 fitted onto the shaft member 150, and a hub 154 rotatably mounted by two bearings 152 and 153 to the shaft member 150. A lead cable 155 is coupled to a stator core 151b of the stator 151 in the hub facing side 156 of a stator core 151a of the same.

The connecting end 157 of the lead cable 155 remains pressed down by a pressing member 158 against the hub facing side 156 of the stator core 151a.

The pressing member 158 may be a washer fitted onto the shaft member 102. The washer or pressing member 158 is securely held for no axial movement by a stopper ring 160 installed in a circumferential recess 15 of the shaft member 150.

The shaft member 150 has an axially extending bore 161 therein. The bore 161 is communicated with a lead cable opening 163 provided open at the intermediate 162 of the shaft member 162 so that the lead cable 155 can extend through the opening 163 and the bore 161 to the outside of the motor.

According to the third embodiment, the connecting end 157 of the lead cable 155 remains pressed down against the hub facing side 156, thus being allowed no movement and disturbing neither the shaft member 152 nor the hub 154 during the rotation. In the prior art, displacement of the connecting end of such a lead cable is hardly disregarded and it is thus an awesome task to reduce the axial length of a motor to a minimum. The spindle motor of the third embodiment allows no displacement of the connecting end 157 of the lead cable 155, whereby its axial length will be minimized. The lead cable 155 itself can be secured in position with less chance of movement.

Figure 8:
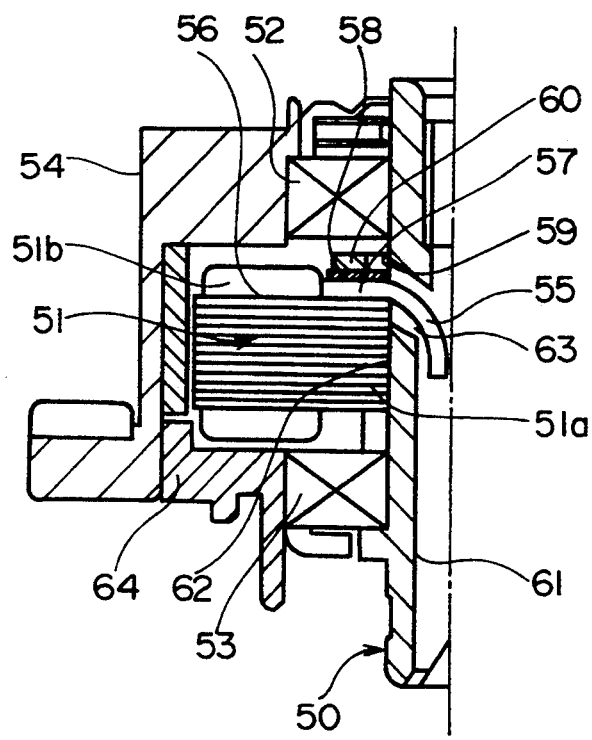
FIG. 8 is a cross sectional view of a primary part of a further spindle motor showing a third embodiment of the present invention.

Also, as apparent from FIG. 8, soldering of the lead cable 155 in the spindle motor can be carried out from above without inversion of the motor body during the assembling of the shaft member 150 and the stator 151 in a production step.

It would be understood that the present invention is not limited to the foregoing embodiments and various changes and modifications will be possible without departing the spirit and scope of the present invention. For example, the spindle motor shown in FIG. 8 may be modified in which the hub 154 has an annular recess provided about the shaft in the inner side thereof for holding urging means which is intended to urge the outer race of the upper bearing 152 axially in the inward direction. The urging means may be selected from a disk spring similar to one described in the second embodiment, an O-ring, and other appropriate devices. The pressing member 158 of the third embodiment may be a C-ring or E-ring which serves as a stopper.

We claim:

1. A spindle motor with a labyrinth sealed bearing comprising:

a stationary member;

a hub for rotation relative to the stationary member;

ball bearings mounted between the stationary member and the hub;

a labyrinth sealing means provided axially outside of the ball bearings for preventing the escape of grease from the ball bearings;

said labyrinth sealing means comprising a first member mounted to the stationary member, a second member mounted to the hub, and a third member mounted to the stationary member and having a shape identical to that of the first member; and said first and third members, each having an annular portion thereof fixedly mounted to the stationary member and an annular projection thereof extending radially outwardly from the annular portion, and said second member having an annular portion thereof fixedly mounted to the hub and an annular projection thereof extending radially inwardly from the annular portion, the three projections of the first, second, and third members being axially aligned towards the outside of the motor, the annular portion of the third member abutting at one end a corresponding end of the annular portion of the first member.

2. A spindle motor with a labyrinth sealed bearing according to claim 1, wherein the labyrinth sealing member further comprises a fourth member which has an annular portion thereof mounted to the hub and a projection thereof extending radially inwardly from the annular portion and having a shape identical to that of the second member, the annular portion of the fourth member abutting at one end a corresponding end of the annular portion of the second member and the inwardly extending projection of the fourth member disposed axially outside of the outwardly extending projection of the third member.

* * * * *

UNITED STATES PATENT AND TRADEMARK OFFICE
CERTIFICATE OF CORRECTION

PATENT NO. : 5,347,189

DATED : September 13, 1994

INVENTOR(S) : Chuta et al.

It is certified that error appears in the above-identified patent and that said Letters Patent is hereby corrected as shown below:

On the title page, item [73]:

Add the following Assignee--Nagano Nidec Corporation, Nagano-Ken, Japan--.

Signed and Sealed this

Twenty-seventh Day of June, 1995

Attest:

BRUCE LEHMAN

*Attesting Officer*   *Commissioner of Patents and Trademarks*